US011540514B2

(12) United States Patent
Clevenger et al.

(10) Patent No.: US 11,540,514 B2
(45) Date of Patent: Jan. 3, 2023

(54) ELECTROCHEMICAL ATTACHMENT OF PHOSPHONIC ACIDS TO METALLIC SUBSTRATES AND ANTIMICROBIAL MEDICAL DEVICES CONTAINING SAME

(71) Applicant: Molecular Surface Technologies, LLC, Warren, NJ (US)

(72) Inventors: Randell Clevenger, North Plainfield, NJ (US); Gordon D. Donald, Oceanport, NJ (US); Cheoljin Kim, North Brunswick, NJ (US)

(73) Assignee: MOLECULAR SURFACE TECHNOLOGIES, LLC, Warren, NJ (US)

( * ) Notice: Subject to any disclaimer, the term of this patent is extended or adjusted under 35 U.S.C. 154(b) by 0 days.

(21) Appl. No.: 16/906,573

(22) Filed: Jun. 19, 2020

(65) Prior Publication Data

US 2020/0404905 A1 Dec. 31, 2020

Related U.S. Application Data

(60) Provisional application No. 62/866,492, filed on Jun. 25, 2019.

(51) Int. Cl.
*A01N 25/24* (2006.01)
*C25D 11/36* (2006.01)
*A01N 57/20* (2006.01)
*A01N 43/16* (2006.01)

(52) U.S. Cl.
CPC ............ *A01N 25/24* (2013.01); *A01N 43/16* (2013.01); *A01N 57/20* (2013.01); *C25D 11/36* (2013.01)

(58) Field of Classification Search
CPC ........ A01N 43/16; A01N 57/20; A01N 33/12; C25D 11/36
See application file for complete search history.

(56) References Cited

U.S. PATENT DOCUMENTS

| 4,166,776 A | 9/1979 | Lefebvre et al. |
| 5,032,237 A | 7/1991 | Wiserman et al. |
| 5,102,507 A | 4/1992 | Wieserman et al. |
| 5,126,210 A | 6/1992 | Wieserman et al. |
| 5,277,788 A | 1/1994 | Nitowski et al. |
| 6,146,767 A | 11/2000 | Schwartz |
| 6,645,644 B1 | 11/2003 | Schwartz et al. |
| 7,396,594 B2 | 7/2008 | Schwartz et al. |
| 7,507,483 B2 † | 3/2009 | Schwartz |
| 7,569,285 B2 | 8/2009 | Schwartz et al. |
| 7,815,963 B2 | 10/2010 | Schwartz et al. |
| 7,879,456 B2 | 2/2011 | Schwartz et al. |
| 7,931,943 B2 | 4/2011 | Schwartz et al. |
| 8,092,585 B2 | 1/2012 | Schwartz et al. |
| 9,868,808 B2 | 1/2018 | Clevenger et al. |
| 10,390,533 B2 | 8/2019 | Clevenger |
| 10,499,750 B2 | 10/2019 | Caicedo-Carvajal et al. |
| 2006/0073280 A1 | 4/2006 | Bauer et al. |
| 2008/0206443 A1 | 8/2008 | Schwartz et al. |
| 2009/0004481 A1 | 1/2009 | Schwartz et al. |
| 2010/0167072 A1 | 7/2010 | Chouai et al. |
| 2010/0215643 A1 | 8/2010 | Clevenger et al. |
| 2011/0100081 A1 | 5/2011 | Rau et al. |
| 2014/0364391 A1* | 12/2014 | Hai .................. G01N 33/54353 514/723 |
| 2015/0071982 A1* | 3/2015 | Lee ......................... A61L 27/34 427/2.24 |
| 2015/0132470 A1 | 5/2015 | Namba |
| 2016/0168725 A1 | 6/2016 | Pfirrmann et al. |
| 2017/0292064 A1 | 10/2017 | Monroe et al. |
| 2018/0103643 A1* | 4/2018 | Clevenger ............. C08F 220/34 |

OTHER PUBLICATIONS

Peng, Z-X. et al. "Quaternized Chitosan Inhibits icaA Transcription and Biofilm Formation by *Staphylococcus* on a Titanium Surface" Antimicrobial Agents and Chemotherapy, Feb. 2011, p. 860-866 (Year: 2011).*

Hatta, S. et al. Studies on macramin, a new high-molecular antibacterial substance derived from chitin. Jpn. Med J. 1950, 3, 119-123 (Year: 1950).*

Anitha et al., Synthesis, characterization, cytotoxicity and antibacterial studies of chitosan, O-carboxymethyl and N,O-carboxymethyl chitosan nanoparticles, Carbohydrate Polymers, 2009, 78, pp. 672-677.

Arnold et al., Efficacy of i-Factor Bone Graft versus Autograft in Anterior Cervical Discectomy and Fusion, Spine, 2016, vol. 41, No. 13, pp. 1075-1083.

Borchard, Chitosans for gene delivery, Advanced Drug Delivery Reviews, 2001, 52, pp. 145-150.

Dubey et al., Characterization of self-assembled organic films using differential charging in X-ray photoelectron spectroscopy, Langmuir, 2006, 22 (10), pp. 4649-4653.

Dubey et al., Structure and Order of Phosphonic Acid-Based Self-Assembled Monolayers on Si(100), Langmuir, 2010, 26 (18), pp. 14747-14754.

Franking et al., Highly Stable Molecular Layers on Nanocrystalline Anatase TiO2 through Photochemical Grafting, Langmuir, 2009, 25 (18), pp. 10676-10684.

(Continued)

*Primary Examiner* — Andrew S Rosenthal
(74) *Attorney, Agent, or Firm* — Panitch Schwarze Belisario & Nadel LLP (57) ABSTRACT

A method of preparing a modified-metal surface. The method includes preparing a solution of a phosphorous-based acid in a solvent; immersing a strip of the metal work piece into the solution of the phosphorous-based acid; immersing a strip of a reference metal into the solution of the phosphorous-based acid; supplying a voltage for a duration of time to prepare a phosphorous acid-modified metal work piece; removing the phosphorous acid-modified metal work piece; cleaning and drying the phosphorous acid-modified metal work piece; applying a chitosan solution to the surface in order to attach chitosan/modified chitosan to the phosphorous acid based modified surface; prepare the modified-metal surface; and cleaning and drying the modified-metal surface.

6 Claims, 2 Drawing Sheets

(56) References Cited

OTHER PUBLICATIONS

Galoppini, Linkers for anchoring sensitizers to semiconductor nanoparticles, Coordination Chemistry Reviews (2004), 248, pp. 1283-1297.
Gao et al., Solid-State Nmr-Studies of Self-Assembled Monolayers, Langmuir, 1995, 11, pp. 1860-1863.
Gawalt et al., Enhanced bonding of alkanephosphonic acids to oxidized titanium using surface-bound alkoxyzirconium complex interfaces, Langmuir, 1999, 15 (26), pp. 8929-8933.
Gawalt et al., Enhanced bonding of organometallics to titanium via a titanium(III) phosphate interface, Langmuir, 2001; 17 (21), pp. 6743-6745.
Gawalt et al., Self-assembly and bonding of alkanephosphonic acids on the native oxide surface of titanium, Langmuir, 2001; 17 (19), pp. 5736-5738.
Gouzman et al., Monolayer vs. multilayer self-assembled alkylphosphonate films: X-ray photoelectron spectroscopy studies, Surface Science, 2006; 600, pp. 773-781.
Hanson et al., Bonding self-assembled, compact organophosphonate monolayers to the native oxide surface of silicon, J. Am. Chem. Soc., 2003, 125 (51), pp. 16074-16080.
Hirano et al., Effects of chitosan, pectic acid, lysozyme, and chitinase on the growth of several phytopathogens, Agricultural and Biological Chemistry, 1989, 53 (11), pp. 3065-3066.
International Search Report and Written Opinion dated Jun. 25, 2019 in related Application No. PCT/US19/27330 filed Apr. 12, 2019 (9 pages).
International Search Report and Written Opinion dated Apr. 28, 2020 in related Application No. PCT/US19/68579 filed Dec. 26, 2019 (19 pages).
Jayakumar et al., Bioactive and metal uptake studies of carboxymethyl chitosan-graft-D-glucuronic acid membranes for tissue engineering and environmental applications, International Journal of Biological Macromolecules, 2009, 45, pp. 135-139.
Jayakumar et al., Chitosan conjugated DNA nanoparticles in gene therapy, Carbohydrate Polymers, 2010, 79, pp. 1-8.
Jayakumar et al., Novel chitin and chitosan nanofibers in biomedical applications, Biotechnology Advances, 2010, 28, pp. 142-150.
Jennings et al., Chitosan Based Biomaterials, vol. 1: Fundamentals, 2017, Elsevier (323 pages).
Jennings et al., Chitosan Based Biomaterials, vol. 2: Tissue Engineering and Therapeutics, 2017, Elsevier (278 pages).
Kasaj et al., Clinical evaluation of anorganic bovine-derived hydroxyapatite matrix/cell-binding peptide (P-15) in the treatment of human infrabony defects., Clin Oral Invest, 2008, 12, pp. 241-247.
Liu et.al., Covalent attachment of P15 peptide to titanium surfaces enhances cell attachment, spreading, and osteogenic gene expression, Journal of Orthopaedic Research, 2012, pp. 1-9.
Madhumathi et al., Development of novel chitin/nanosilver composite scaffolds for wound dressing applications, Journal of Materials Science: Materials in Medicine, 2010, 21, pp. 807-813.
Prabaharan, Review paper: chitosan derivatives as promising materials for controlled drug delivery, Journal of Biomaterials Applications, 2008, 23, pp. 5-36.
Pubchem, Substand Record for SID 234146215, available Feb. 12, 2015, retrieved Mar. 30, 2020, https://pubchem.ncbi.nlm.nih.gov/substance/234146215.
Pujari et al., Covalent Surface Modification of Oxide Surfaces, Angew. Chem. Int. Ed. (2014), 53, pp. 2-36.
Sherman et al., Evaluation of ABM/P-15 versus autogenous bone in an ovine lumbar interbody fusion model., Eur Spine J, 2010, 19, pp. 2156-2163.
Tiwari et al., Electrochemical synthesis of chitosan-co-polyaniline/WO3-nH2O composite electrode for amperometric detection of NO2 gas, Electroanalysis 20, 2008, 16, pp. 1775-1781.
Weber et al., Glycosylidene Carbenes, Helvetica Chimica Acta, 1998, 81, pp. 1359-1372.
Woodward et al., Self-assembled monolayer growth of octadecylphosphonic acid on mica, Langmuir, 1996, 12, pp. 3626-3629.
Yukna et al., Multi-center clinical evaluation of combination anorganic bovine-derived hydroxyapatite matrix (ABM)/cell binding peptide (P-15) as a bone replacement graft material in human periodontal osseous defects. 6-month results., J Periodontol. 1998, 69, pp. 655-663.
Yukna et al., Thirty-six month follow-up of 25 patients treated with combination anorganic bovine-derived hydroxyapatite matrix (ABM)/cell-binding peptide (P-15) bone replacement grafts in human infrabony defects. I. Clinical findings., J Periodontol. 2002, 73, pp. 123-128.
Adden et al., "PhosphonicAcid Monolayers for Binding of Bioactive Molecules to Titanium Surfaces," Langmuir, vol. 22, No. 19, pp. 8197-8204 (2006).
Freitas et al., "An Overview of Current Knowledge on the Properties, Synthesis and Applications of Quaternary Chitosan Derivatives," Polymers, vol. 12, No. 2878, pp. 1-41 (2020).
Illy et al., "Synthesis of Water-Soluble Allyl-Functionalized Oligochitosan and Its Modification by Thiol-Ene Addition in Water," Journal of Polymer Science, Part A: Polymer Chemistry, vol. 52, pp. 39-48 (2014).
Jeong et al., "BMP-2 immobilization by phosphonated UV-curable low-molecular-weight chitosan derivative on the surface of titanium," Journal of Industrial and Engineering Chemistry, vol. 34, pp. 33-40 (2016).
Kim et al., "Preparation of Photo-Reactive Azidophenyl Chitosan Derivative for Immobilization of Growth Factors," Journal of Applied Polymer Science, vol. 117, pp. 3029-3037 (2010).
Kim et al., "Enhancement Effect of Cell Adhesion on Titanium Surface Using Phosphonated Low-Molecular-Weight Chitosan Derivative," Macromolecular Research, DOI 10.1007/s13233-015-3135-9, pp. 1-5 (2015).
Mondal et al., "Novel quaternized aromatic amine based hybrid PVA membranes for acid recovery," Journal of Membrane Science, vol. 490, pp. 29-37 (2015).
Piras et al., "Antibacterial, Antibiofilm, and Antiadhesive Properties of Different Quaternized Chitosan Derivatives," International Journal of Molecular Sciences, vol. 20, No. 6297, pp. 1-21 (2019).
Smith et al., "A Comprehensive Review of the Covalent Immobilization of Biomolecules onto Electrospun Nanofibers," Nanomaterials, vol. 10, No. 2142, pp. 1-39 (2020).
Tang et al., "The Reaction of Carbonyldiimidazole with Alcohols to Form Carbamates and N-Alkylimidazoles," Synthesis, No. 15, pp. 2540-2544 (2004).
Xu et al., "Surface chemical study on the covalent attachment of hydroxypropyltrimethyl ammonium chloride chitosan to titanium surfaces," Applied Surface Science, vol. 257, p. 10520-10528 (2011).
Zhao-Xiang Peng, et al., "Quaternized Chitosan Inhibits icaA Transcription and Biofilm Formation by *Staphylococcus* on a Titanium Surface," Antimicrobial Agents and Chemotherapy, vol. 55, No. 2, pp. 860-866 (2011), American Society for Microbiology (Washington, DC), published on Dec. 6, 2010.†
Jennifer Wakefield, et al., "Controlled Depolymerization Assessed by analytical Ultracentrifugation of Low Molecular Weight Chitosan for Use in Archaeological Conservation," European Biophysics Journal, vol. 47, pp. 769-775 (2018), Springer (Berlin, Germany), published on Mar. 17, 2018.†
Pengtao Liu, et al., "Quaternary Ammonium Salt of Chitosan: Preparation and Antimicrobial Property for Paper," Open Medicine, vol. 10, pp. 473-478 (2015), De Gruyter Open Access (Berlin, Germany), published on Dec. 17, 2015.†

\* cited by examiner
† cited by third party

ELECTROCHEMICAL ATTACHMENT OF PHOSPHONIC ACIDS TO METALLIC SUBSTRATES AND ANTIMICROBIAL MEDICAL DEVICES CONTAINING SAME

CROSS REFERENCE TO RELATED APPLICATIONS

The present patent application claims the benefit of U.S. Provisional Patent Application No. 62/866,492 filed 25 Jun. 2019; which is incorporated herein by reference in its entirety for all purposes.

BACKGROUND

Phosphonic acids are the gold standard for surface modification of metallic substrates. Phosphates, phosphonates and phosphinates form strong hydrolytically stable bonds with metallic surfaces by bonding to the oxide layer which exists on said surfaces. The oxide layer can either be the native oxide layer that forms spontaneously in air or an oxide layer formed by a process such as anodization Conventionally[1-9], phosphonic acids are attached to metals by forming a chemisorbed layer and driving chemical attachment of said layer to the metal surface. The chemisorbed layer is formed by soaking or spraying the phosphonic acid on the metal surface. Chemical attachment is generally achieved by application of heat. The heating step is, conventionally, carried out at around 130° C. for 18 to 36 hours. The heating may be reduced to about 4 hours by baking at 170° C. Alternatively, as described in U.S. Pat. No. 5,126,210, anodization (under aqueous conditions) may be used to attach short water soluble phosphonic acids to aluminum. However, the process described in U.S. Pat. No. 5,126,210 is limited to phosphonic acids having carbon chain lengths no longer than three carbons, because phosphonic acids with chain lengths longer than three carbons are typically insoluble in water.

Metallic surfaces bonded to a phosphonic acid overlayer may be used to add antibacterial properties for use in, for example, antimicrobial medical devices, including, but not limited to, orthopedic implants.

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

While certain aspects of conventional technologies have been discussed to facilitate disclosure of the invention, the inventors of this application in no way disclaim these technical aspects, and it is contemplated that the claimed invention may encompass or include one or more of the conventional technical aspects discussed herein.

SUMMARY OF INVENTION

An inventive aspect of this application aims to address the drawbacks associated with conventional methods for attaching phosphonic acids to a metal. Longer more complex phosphonic acids, such as phosphonic acids having chain lengths of about three carbon atoms or longer, can be attached to a metal, such as titanium, aluminum, cobalt chrome and the like, by the method described herein, because such phosphonic acids are soluble in an organic solvent. An example of such organic solvents includes, but is not limited to, alcohols, tetrahydrofuran (THF), dimethylformamide (DMF), diemthylsulfoxide (DMSO), and the like.

An exemplary embodiment of this application is directed to a method of preparing a modified-metal surface by attaching a phosphorous-based acid to a surface of a metal. The method comprises: preparing a solution of the phosphorous-based acid in a solvent; immersing a metal work piece or at least a piece of a metal work piece into the solution of the phosphorous-based acid; immersing a reference metal or at least a piece of a reference metal into the solution of the phosphorous-based acid; supplying a voltage for a duration of time; removing the metal work piece; cleaning the metal work piece; and drying the cleaned metal work piece to obtain a modified metal work piece. The atmosphere under which the cleaned metal work piece is dried is not limited, and may include an inert atmosphere, dry air, and the like.

In another exemplary embodiment, the phosphorous-based acid is a phosphonic acid, a phosphoric acid, a phosphinic acid, or mixtures thereof In another exemplary embodiment, the phosphorous-based acid is a phosphonic acid having the following formula: $(OH)_2P(O)(RX)$, wherein R is an alkyl group having more than three carbon atoms, and X is selected from the group consisting of a substituted or unsubstituted hydroxyl group, a substituted or unsubstituted amine group, and a substituted or unsubstituted ester group.

In another exemplary embodiment, the phosphorous-based acid is a phosphonic acid having the following formula: $(OH)_2P(O)(RX)$, wherein R is an alkyl group having four carbon atoms, five carbon atoms, six carbon atoms, seven carbon atoms, eight carbon atoms, nine carbon atoms, ten carbon atoms, eleven carbon atoms, twelve carbon atoms, thirteen carbon atoms, fourteen carbon atoms, fifteen carbon atoms, sixteen carbon atoms, seventeen carbon atoms, eighteen carbon atoms, nineteen carbon atoms, twenty carbon atoms, twenty-one carbon atoms, twenty-two carbon atoms, twenty-three carbon atoms, twenty-four carbon atoms, or twenty-five carbon atoms.

In another exemplary embodiment, X is a substituted or unsubstituted methacrylate group.

In another exemplary embodiment, the phosphonic acid is selected from the group consisting of octadecylphosphonic acid, undecalphosphonic acid, decaphosphonic acid, and dodecaphosphonic acid.

In another exemplary embodiment, the metal is a nonferrous metal.

In another exemplary embodiment, the metal is selected from the group consisting of Ti, Zr, Hf, V, Nb, Ta, Al, Co and alloys thereof.

In another exemplary embodiment, the metal is selected from the group consisting of titanium, titanium alloys, aluminum and aluminum alloys.

In another exemplary embodiment, the solvent is selected from the group consisting of methanol, ethanol, propanol, isopropanol, propenol, butanol, sec-butanol, tert-butanol, tetrahydrofuran (THF), demethylformamide (DMF), dimethyl sulfoxide (DMSO), and mixtures thereof.

In another exemplary embodiment the concentration of the solution is from about 1% to about 10% solution by weight. In another exemplary embodiment the concentration of the solution is about 1%, about 2%, about 3%, about 4%, about 5%, about 6%, about 7%, about 8%, about 9%, about 10%, about 11%, about 12%, about 13%, about 14%, or about 15%.

In another exemplary embodiment, the voltage applied may range from about 1 V to about 300 V. In another exemplary embodiment, the voltage applied may be about 10 V, about 20 V, about 30 V, about 40 V, about 50 V, about 60 V, about 70 V, about 80 V, about 90 V, about 100 V, about 110 V, about 120 V, about 130 V, about 140 V, about 150 V, about 160 V, about 170 V, about 180 V, about 190 V, about 200 V, about 210 V, about 220 V, about 230 V, about 240 V, about 250 V, about 260 V, about 270 V, about 280 V, about 290 V or about 300 V.

In another exemplary embodiment, the voltage applied may range from about 1 V to about 100 V. In another exemplary embodiment, the voltage applied may be about 1 V, about 2 V, about 3 V, about 4 V, about 5 V, about 6 V, about 7 V, about 8 V, about 9 V, about 10 V, about 11 V, about 12 V, about 13 V, about 14 V, about 15 V, about 16 V, about 17 V, about 18 V, about 19 V, about 20 V, about 21 V, about 22 V, about 23 V, about 24 V, about 25 V, about 26 V, about 27 V, about 28 V, about 29 V, about 30 V, about 31 V, about 32 V, about 33 V, about 34 V, about 35 V, about 36 V, about 37 V, about 38 V, about 39 V, about 40 V, about 41 V, about 42 V, about 43 V, about 44 V, about 45 V, about 46 V, about 47 V, about 48 V, about 49 V, about 50 V, about 51 V, about 52 V, about 53 V, about 54 V, about 55 V, about 56 V, about 57 V, about 58 V, about 59 V, about 60 V, about 61 V, about 62 V, about 63 V, about 64 V, about 65 V, about 66 V, about 67 V, about 68 V, about 69 V, about 70 V, about 71 V, about 72 V, about 73 V, about 74 V, about 75 V, about 76 V, about 77 V, about 78 V, about 79 V, about 80 V, about 81 V, about 82 V, about 83 V, about 84 V, about 85 V, about 86 V, about 87 V, about 88 V, about 89 V, about 90 V, about 91 V, about 92 V, about 93 V, about 94 V, about 95 V, about 96 V, about 97 V, about 98 V, about 99 V, or about 100 V.

In another exemplary embodiment, the duration of time is from about 1 second to about 5 minutes. In another exemplary embodiment, the duration of time is about 1 second, about 5 seconds, about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, about 70 seconds, about 75 seconds, about 80 seconds, about 85 seconds, about 90 seconds, about 95 seconds, about 100 seconds, about 105 seconds, about 110 seconds, about 115 seconds, about 120 seconds, about 130 seconds, about 140 seconds, about 150 seconds, about 160 seconds, about 170 seconds, about 180 seconds, about 190 seconds, about 200 seconds, about 210 seconds, about 220 seconds, about 230 seconds, about 240 seconds, about 250 seconds, about 260 seconds, about 270 seconds, about 280 seconds, about 290 seconds, about 300 seconds, about 6 minutes, about 7 minutes, about 8 minutes, about 9 minutes, or about 10 minutes.

In another exemplary embodiment, the inert atmosphere comprises any nonreactive gas. In another exemplary embodiment, the inert atmosphere is nitrogen or argon.

Another exemplary embodiment of this application is directed to a method for producing a peptide- or protein-modified metal, the method comprising: attaching a phosphorous-based acid to a surface of the metal according to claim 1; carrying out a coupling reaction between the phosphorous-based acid and the carboxyl end of the peptide or protein; and deprotection after coupling to obtain the peptide or protein-modified metal.

Another exemplary embodiment of this application is directed to a method for producing a poly- or oligo-saccharide-modified metal, the method comprising attaching a phosphorous-based acid to a surface of the metal according to claim 1; carrying out a coupling reaction between the phosoprous-based acid and an appropriate functional group of the saccharide to obtain the poly- or oligo-saccharide modified metal.

Another exemplary embodiment of this application is comprised of chitosan, quaternized chitosan, oligo-glucosamine/N-acetylglucosamine, quaternized oligo-glucosamine/N-acetylglucosamine.

Another exemplary embodiment of this application is directed to a method of modifying a polymer, a biopolymer or a ceramic material by attaching a phosphorous-based acid to a surface of the polymer, the biopolymer or the ceramic material, the method comprising: preparing a solution of the phosphorous-based acid in a solvent; immersing a strip of a work piece comprising the polymer, the biopolymer or the ceramic material into the solution of the phosphorous-based acid; immersing a strip of a reference material into the solution of the phosphorous-based acid; supplying a voltage for a duration of time; removing the work piece; cleaning the work piece; and drying the cleaned work piece to obtain a modified work piece.

Another exemplary embodiment of this application is directed to a method of preparing a modified-metal surface, the method comprising: preparing a solution of a phosphorous-based acid in a solvent; exposing a metal work piece or at least a portion of a metal work piece to oxygen plasma to prepare a metal work piece or at least a portion of a metal work piece having a hydroxyl-terminated surface; immersing a metal workpiece or at least a portion of the metal work piece having a hydroxyl-terminated surface into the solution of the phosphorous-based acid; immersing a strip of a reference metal into the solution of the phosphorous-based acid; supplying a voltage for a duration of time to prepare a phosphorous acid-terminated metal work piece; removing the phosphorous acid-terminated metal work piece; activating the said work with a coupling agent spraying the phosphorous acid-terminated metal work piece with a chitosan or modified chitosan solution to prepare the modified-metal surface; and cleaning and drying the modified-metal surface.

In another exemplary embodiment, the phosphorous-based acid is a phosphonic acid, a phosphoric acid, a phosphinic acid, or mixtures thereof.

In another exemplary embodiment, the phosphonic acid is selected from the group consisting of 11-phospho-1-undecanol.

In another exemplary embodiment, the metal is a non-ferrous metal.

In another exemplary embodiment, the metal is selected from the group consisting of Ti, Zr, Hf, V, Nb, Ta, Al, Co and alloys thereof.

In another exemplary embodiment, the metal is selected from the group consisting of titanium, titanium alloys, aluminum and aluminum alloys.

In another exemplary embodiment, the metal is stainless steel.

In another exemplary embodiment, the solvent is selected from the group consisting of n-butanol, isopropanol, ethanol, methanol, formic acid, acetic acid, tetrahydrofuran (THF), demethylformamide (DMF), dimethyl sulfoxide (DMSO), and ionic liquids.

In another exemplary embodiment, the chitosan solution comprises a chitosan modified with a quaternary ammonium salt.

In another exemplary embodiment, the method further comprises preparing the chitosan solution comprising: dissolving chitosan in an acetic acid solution and adding hydrogen peroxide to prepare a first solution; irradiating the first solution at a constant power to prepare a second solution; adding an alkaline solution to the second solution to adjust the pH to be about 9.0 and centrifuging the resulting solution; separating a precipitate from a supernatant of the resulting solution; dissolving the precipitate in an organic solvent to prepare a third solution; adding a reactive quaternary ammonium salt to the third solution, and stirring at room temperature; and precipitating quaternized-oligo-chitosan therefrom; dissolving the quaternized-oligo-chitosan in an organic solvent to prepare the chitosan solution.

Another exemplary embodiment of this application is directed to an article comprising a work piece having a modified-metal surface, wherein the modified-metal surface comprises a chitosan modified with a quaternary ammonium salt.

In another exemplary embodiment, the chitosan is connected to a surface of the work piece via a phosphorous-based acid linker.

In another exemplary embodiment, the phosphorous-based acid is a phosphonic acid, a phosphoric acid, a phosphinic acid, or mixtures thereof In another exemplary embodiment, the phosphonic acid is selected from the group consisting of 11-phosphono-1-undecanol.

In another exemplary embodiment, the article has an antimicrobial effect.

Details of other exemplary embodiments of the present disclosure will be included in the following detailed description and the accompanying drawings.

DETAILED DESCRIPTION

Advantages and features of the present disclosure, and methods for accomplishing the same will be more clearly understood from exemplary embodiments described below with reference to the accompanying drawings. However, the present disclosure is not limited to the following exemplary embodiments and may be implemented in various different forms. The exemplary embodiments are provided only to complete disclosure of the present disclosure and to fully provide a person having ordinary skill in the art to which the present disclosure pertains with the category of the invention, and the present disclosure will be defined by any appended claims and combinations thereof Shapes, sizes, ratios, angles, numbers, and the like shown in the accompanying drawings are merely exemplary, and the present disclosure is not limited thereto. Like reference numerals generally denote like elements throughout the present specification. Further, in the following description, a detailed explanation of well-known related technologies may be omitted to avoid unnecessarily obscuring the subject matter of the present disclosure. Terms such as "including," "having," and "consisting of" used herein are generally intended to allow other components to be included unless the terms are used in conjunction with the term "only." Any references to the singular may include the plural unless expressly stated otherwise.

Components are interpreted to include an ordinary error range even if not expressly stated.

As used herein, the singular forms "a," "an" and "the" are intended to include the plural forms as well, unless the context clearly indicates otherwise. Additionally, the use of "or" is intended to include "and/or," unless the context clearly indicates otherwise.

When the positional relation between two parts is described using the terms such as "on," "above," "below," and "next," one or more parts may be positioned between the two parts unless the terms are used in conjunction with the term "immediately" or "directly."

When an element or layer is referred to as being "on" another element or layer, the element or layer may be directly on the other element or layer, or intervening elements or layers may be present.

Although the terms "first," "second," and the like are used for describing various components, these components are not confined by these terms. These terms are merely used for distinguishing one component from the other components, and a first component may be a second component in a technical concept of the present disclosure.

The size and thickness of each component illustrated in the drawings are represented for convenience of explanation, and the drawings are not necessarily to scale.

The features of various embodiments of the present disclosure can be partially or entirely bonded to or combined with each other and can be interlocked and operated in various technical ways, and the embodiments can be carried out independently of, or in association with, each other.

Hereinafter, various exemplary embodiments of the present disclosure will be described in detail with reference to the accompanying drawings.

The phosphorous-based acids attach to metal surfaces by forming strong P—O—M bonds, where M is a metal, and can serve as interfaces between metallic surfaces and the environment. For example, a phosphonic acid comprises a phosphorous atom with two acidic hydroxyls, a double bonded oxygen and a carbon chain attached to the central phosphorus atom. An exemplary phosphonic acid is represented below:

The utility of these functional groups is that the distal end of the organic chain (X) may contain functional groups, which can be further modified. This allows for the installation of a variety of chemistries onto the distal end of these molecules. Thus, covalent attachment of these molecules followed by installation of custom chemistries is tantamount to the covalent attachment of said chemistries onto the surface. Such functional groups may include, but are not limited to, a substituted or unsubstituted hydroxyl, a substituted or unsubstituted amine, a substituted or unsubstituted ester, a substituted or unsubstituted thiol, a substituted or unsubstituted ether, a substituted or unsubstituted phosphonic acid ester, a substituted or unsubstituted phosphinic acid ester, a substituted or unsubstituted phosphoric acid ester, a substituted or unsubstituted carboxylate, a substituted or unsubstituted acrylate, a substituted or unsubstituted sulfonate, a substituted or unsubstituted sulfinate, a substituted or unsubstituted sulfoxide, a substituted or unsubstituted silane, a substituted or unsubstituted siloxane, a substituted or unsubstituted polydimethylsiloxane (PDMS), a substituted or unsubstituted amino ester, a substituted or unsubstituted peptide, both natural and synthetic, a substituted or unsubstituted oligopeptide, proteins, nucleotides, oligonucleotides, polynucleotides, a substituted or unsubstituted sugar, a substituted or unsubstituted polysaccharide, a substituted or unsubstituted oligosaccharide and the like, and these groups may be further modified. The functional group may be a quaternary ammonium salt, and the like.

Manipulating the chemical presentation of a surface to the environment changes the behavior of that surface when compared to an untreated surface. For example, surfaces can be made to be hydrophobic, hydrophilic, oleophobic, lubricious, antimicrobial, and the like. Surfaces may also be made to either enhance or attenuate the effectiveness of adhesives. Further, proteins and protein fragments, amino acids (both natural and synthetic), peptides, poly or oligo saccharides may be attached to enhance or attenuate a biological response such as osteointegration or antimicrobial action.

As discussed earlier in this application, the traditional method for attaching phosphorous-based acids to metallic surfaces is to spray or dip coat a dilute solution onto a metallic surface and thermally drive attachment of the phosphorus-based acids to the metallic surface through heating. In such traditional methods, heating is typically carried out for multiple hours in an oven, at or above about 130° C. Many metal hydroxides are reactive enough to drive attachment of the phosphorous-based acids without heating while addition of heat increases the efficiency of such reactions. For titanium, however, heat is traditionally an absolute requirement for phosphonic/-phoric/-phinic acid attachment.

As described earlier in this application, U.S. Pat. No. 5,126,210 describes an aqueous technique to modify "valve" metals, such as groups IVB and VB, including but not limited to, Ti, Zr, Hf, V, Nb, Ta, Al, and the like, through anodization using small water soluble phosphonic acids. Other researchers, including an inventor of the subject application, have recently expanded on this idea to include anodization using short water soluble phosphonic acids to build a foundational layer upon which antimicrobial surfaces were constructed, for example, as described in U.S. Provisional Application No. 62/408,913. However, the need for water soluble molecules limits the scope and utility of these techniques for attaching phosphonic acids to a metallic surface.

The inventors of this application have developed methods and compositions which utilize anodization-like condition in organic solvents to attach phosphorous based acids to metals. The solvents may include, but are not limited to: protic solvents, such as alcohols (including n-butanol, isopropanol, ethanol, methanol, and the like), acids (including formic acid, acetic acid, and the like); wet polar aprotic solvents, such as tetrahydrofuran (THF), demethylformamide (DMF), dimethyl sulfoxide (DMSO), and the like; and ionic liquids. In an exemplary embodiment, the protic solvent may be an alcohol including, but not limited to, ethanol, methanol, ispropanol and n-butanol. In an exemplary embodiment, the ionic liquid may include, but is not limited to, 1-ethyl-3-methylimidazolium dicyanamide, 1-ethyl-3-methylimidazolium thiocyanate, triethylsulphonium bis(trifluoromethylsulfonyl)imide, N-methyl-N-trioctylammonium bis(trifluoromethylsulfonyl)imide, N-butyl-N-methylpyrrolidinium bis(trifluoromethylsulfonyl)imide, 1-ethyl-3-methylimidazolium tetrafluoroborate and 1-ethyl-3-methylimidazolium trifluoromethylsulfonate.

The metal may include any metal that forms a robust native or installed oxide layer, including, but not limited to, titanium, titanium alloys, aluminum and aluminum alloys, vanadium and vanadium alloys, zirconium and zirconium alloys, hafnium and hafnium alloys, niobium and niobium alloys, tantalum and tantalum alloys, tungsten and tungsten alloys, stainless steel, cobalt chrome, and the like. The material to which the phosphorous-based acid is attached is not limited, and may include polymers, biological polymers, ceramics, and the like.

An inventive aspect of this application is a method of attaching phosphonic acids to a metallic surface. The method includes: preparing a solution of phosphonic acid in a protic solvent; immersing a clean strip or at least a portion of non-ferrous metal, and coupling the same to the cathode of a DC power supply; immersing a metal workpiece or at least a portion of the metal workpiece to be modified in the solution, while ensuring that there is no physical contact between the two pieces; bringing the positive terminal of the power supply into electrical contact with the workpiece; holding for a period of time; and removing the modified workpiece. This process may be followed by successive sonication processes in organic and aqueous solutions and drying the modified workpiece under an inert atmosphere.

The dried workpiece is then analyzed using standard analysis techniques, including, but not limited to, infrared (IR) spectroscopy, contact angle, X-ray Photoelectron Spectroscopy (XPS), Energy-Dispersive X-ray Spectroscopy (EDX), Atomic Force Microscopy (AFM), Time-of-Flight Secondary Ion Mass Spectrometry (ToF-SIMS), Coefficient of Friction (COF) studies, and combinations thereof.

In the above-described method, the phosphonic acid solution may be prepared using a solvent, such that the concentration of the solution varies from 0.001% to a saturated composition. Preferred concentrations of the solution may range from about 0.1% to about 20% solution by weight, preferably from about 0.5% to 15% solution by weight, more preferably from about 1% to about 10% solution by weight.

The voltage of the DC power supply used in the above-described method may range from about 1 V to about 100 V.

The reaction time, during which the metal work piece or the at least the portion of the metal workpiece is held immersed in solution during the supply of electric current, may range from about 1 second to about 30 minutes, from about 1 second to about 5 seconds, from about 1 second to about 10 seconds, from about 1 second to about 15 seconds, from about 1 second to about 20 seconds, from about 1 second to about 30 seconds, from about 1 second to about 1 minute, from about 1 second to about 5 minutes, from about 1 second to about 10 minutes, from about 1 second to about 20 minutes, from about 10 seconds to about 30 minutes; from about 20 seconds to about 20 minutes; from about 30 seconds to about 10 minutes; or from about 30 second to about 5 minutes.

The inert atmosphere may be nitrogen or argon.

An inventive aspect of this application is a method for the attachment of oligomeric chitosan or oligomeric glucosamine, and related biological materials, to the phosphonic acid to form a surface having chitosan fragments immobilized thereon. Chitosan is a biocompatible and biodegradable cationic polysaccharide, which has a number of commercial and possible biomedical uses.[10] Chitosan can easily be processed into functionalized nanoparticles,[11] scaffolds for tissue engineering,[12] nanofibers,[13] and nanomembranes.[14] Chitosan and modified chitosan have found use in a wide variety of biomedical applications[15] such as wound healing[16], gene delivery[17], protein/peptide and nucleic acid delivery[18], biosensors[19] and as an antimicrobial agent[20]

The chitosan molecules may be further modified with various functional groups, including but not limited to, a substituted or unsubstituted hydroxyl, a substituted or unsubstituted amine, a substituted or unsubstituted ester, a substituted or unsubstituted thiol, a substituted or unsubstituted ether, a substituted or unsubstituted phosphonic acid ester, a substituted or unsubstituted phosphinic acid ester, a substituted or unsubstituted phosphoric acid ester, a substituted or unsubstituted carboxylate, a substituted or unsubstituted acrylate, a substituted or unsubstituted sulfonate, a substituted or unsubstituted sulfinate, a substituted or unsubstituted sulfoxide, a substituted or unsubstituted silane, a substituted or unsubstituted siloxane, a substituted or unsubstituted polydimethylsiloxane (PDMS), a substituted or unsubstituted amino ester, a substituted or unsubstituted peptide, both natural and synthetic, a substituted or unsubstituted oligopeptide, proteins, nucleotides, oligonucleotides, polynucleotides, a substituted or unsubstituted sugar, a substituted or unsubstituted polysaccharide, substituted or unsubstituted aromatics, substituted or unsubstituted iodo compounds, substituted or unsubstituted benzylic systems, substituted or unsubstituted bridged ring-strain systems, substituted or unsubstituted cyclopropyl compounds, substituted or unsubstituted acrylates, substituted or unsubstituted urethanes, substituted or unsubstituted pyridines, substituted or unsubstituted pyrimidines, substituted or unsubstituted purines, substituted or unsubstituted thiols, substituted or unsubstituted conjugated thiols, substituted or unsubstituted phosphonic acids, substituted or unsubstituted carboxylic acids, substituted or unsubstituted esters, substituted or unsubstituted acid chlorides, substituted or unsubstituted carboxylate salts, substituted or unsubstituted amides, substituted or unsubstituted silanes, substituted or unsubstituted ethers, substituted or unsubstituted acetylacetonates, substituted or unsubstituted salicylates, substituted or unsubstituted quaternary ammonium salts, and the like.

In a preferred embodiment, the chitosan molecules may be further modified with quaternary ammonium salts.

EXAMPLE 1: PREPARATION OF MODIFIED CHITOSAN

1) Depolymerization of Chitosan to Make Oligo-Chitosan (Mw: 2,000)

In a 100 mL pressure-tight vial with a PTFE-lined cap, 1.25 g of chitosan (DDA=76%; 50-190 kDa) were dissolved in 37.0 mL of a 0.93 mol/L aqueous acetic acid solution (d=1.05 g/cm$^3$, 2.06 g/37 mL) by stirring for 5 min and sonicating for 2 min. 1.46 g of a 30% hydrogen peroxide solution in water were added to the mixture and the vial was sealed by a screw cap. The solution was microwaved at a constant power (1,000 W) for about 30 seconds, resulting in a very hot solution. The solution was shaken for about 1 min, and then MW irradiated at a constant power (1,000 W) for about 15 seconds, followed by cooling in a water bath to room temperature. The resulting yellow solution was fully translucent. 63 mL of DI water was added to the solution, and the pH adjusted to 9.0 by the addition of an appropriate amount of KOH. The solution was divided into four equal 25 mL portions and placed in 50 mL Falcon tubes which were then centrifuged at 4,000 rpm for about 4 min. The precipitate and the supernatant were separated. The precipitate was washed and centrifuged three times with water and one time with DMSO.

2) Reaction Between Oligo-Chitosan and Glycidyl Trimethylammonium Chloride (Mw: 151.66)

0.444 g of oligo-chitosan (2.688 mmol of NH$_2$ groups, 1 NH$_2$ eq.) was dissolved in 18.0 mL of DMSO under vigorous stirring for about 10 min. 0.82 g of glycidyl trimethylammonium chloride (5.37 mmol, 2.0 eq.) was added dropwise to the solution, and the mixture was stirred at room temperature for 72 hours. The resulting quaternized-oligochitosan was precipitated in acetone or toluene and washed/centrifuged two times in DMSO. The white powder was dried under vacuum at 25° C. for 72 h h. This process is illustrated in the following reaction scheme (1):

Reaction Scheme 1

EXAMPLE 2: PREPARATION OF SURFACES WITH MODIFIED CHITOSAN IMMOBILIZED THEREON

1) Cleaning of Surfaces (Coupons: Metal)

The surface of metallic coupons are extensively cleaned using a series of washes/sonications in Alkanox, water and ethanol followed by exposure to UV/O$_3$ (5 min) to remove any residual organics prior to the deposition of a phosphonic acid linker (PUL=11-phosphono-1-undecanol).

2) Electrochemical Deposition of PUL Coating:

In a clean ceramic dish were added a thin titanium foil which was covered completely with an insulating silicone mesh. Metallic coupons were placed onto the mesh and the entire assembly was covered with a 1% w/v methanolic solution of PUL. The foil was connected to the negative terminal of a DC power supply and would serve as the cathode in the subsequent electrochemical reaction. The coupon was placed in contact with the positive terminal of the power supply to complete the circuit. Deposition/modification was carried out at 90V for 1 minute followed by sonications in both ethanol and water (2×5 min). Infrared spectroscopy on the cleaned and dried surface confirmed the presence of bound PUL.

3) Surface Activation:

PUL coated coupons were racked in a glass chamber and covered completely with dichloromethane ($CH_2Cl_2$, 240-250 mL). To the stirred mixture, CDI (3 g) was added, and the chamber covered with a fitted glass lid. The fitted glass lid was wrapped with teflon tape to improve the seal. The resulting mixture was stirred for about 4 hours at room temperature on a magnetic stirrer plate set at approximately 300-500 rpm. Coupons were sonicated twice in acetone for 10 minutes, and dried in vacuo.

4) Attaching Quaternized Chitosan to the Surface

The quaternized-oligo-chitosan solution (0.1 g/10 mL DMSO) was sprayed once on the CDI-activated coupons (approximately 0.001 g). The coupons were horizontally placed on the plate to improve the thickness uniformity of coating, and then reacted at 100° C. for 10 minutes. The spraying and reaction processes were carried out on both sides of the coupons. The coupons were then sonicated in EtOH twice for about 10 minutes, and dried in vacuo. This process is illustrated for stainless steel in the following reaction scheme (2):

Chitosan metal

Experimental Results:

(1) An In vitro elution cytotoxicity study, ISO 10993-5 was designed to show whether cytotoxic material comes off a treated surface during soaking. Test articles showed a grade of 0 which reveals that there was NO cytotoxicity associated with treated materials. Additionally, a test for irritation and skin sensitization was performed (ISO 10993-10) which showed no irritation following intracutaneous injections of extracts. An ISO systemic toxicity study, ISO 10993-11 also showed no toxicity.

Figure 1:
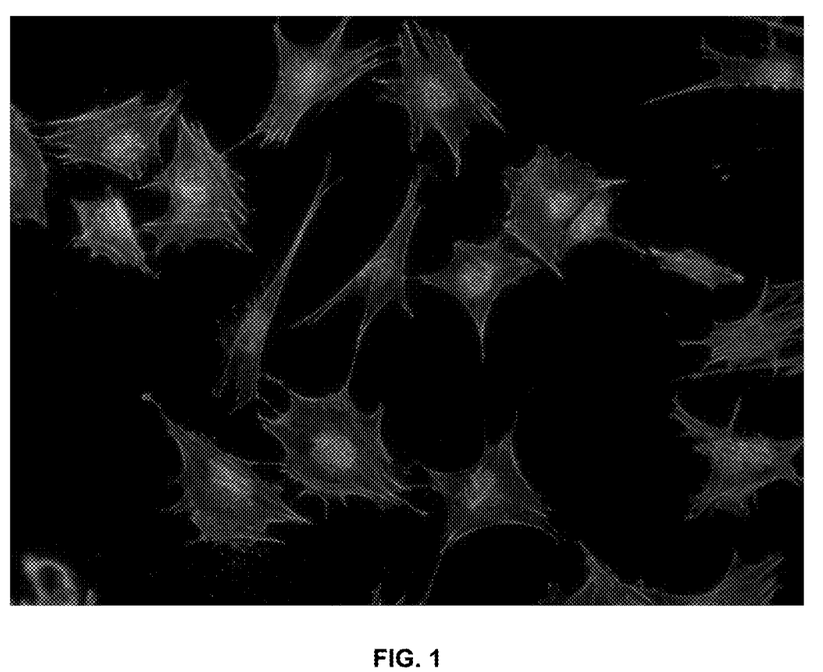
FIG. 1 shows the growth of the MLO-A5 cells on a chitosan-treated surface.

As a further demonstration of biocompatibility, murine osteocyte-like cells, ML O-A5 (postosteoblast/preosteocyte-like cell line) were seeded onto titanium coupons prepared in the same manner as described above for stainless steel coupons. After about 16 hours, the coupons were washed, fixed and stained with 100 nM DAPI/100 nM Phalloidine-488 (culture medium supplemented with 5% FBS). DAPI (nuclei) and Phalloidin (cytoskeleton) images were combined to show the growth of the MLO-A5 cells on the treated surface, as shown in FIG. 1. What can be seen from the figure is that the osteoblasts have attached, spread and are dividing. Cell morphology appears to be that of healthy cells.

(2) Study of Antibacterial Potency of the Modified Surfaces Against Four Different Strains of Bacteria:

Modified surfaces prepared as described in Example 2 above were treated with four different strains of bacteria (*Escherichia coli*, *Staphylococcus aureus*, *Staphylococcus epidermis* and *Psueomonas aeruginosa*) to demonstrate the antibacterial potency of the modified surfaces compared to untreated surfaces (control coupons). In each of the following Experimental Examples 1 to 4, the CFU/ml for each of the bacteria was measured for both the modified and unmodified surfaces.

TABLE 1

E. coli-Control and modified coupons were immersed in E. coli culture (24 wells, 0.5 ml, OD600 = 0.01) for 1 hour.

|  | Example 1.1 | Example 1.2 | Example 1.3 | C. Example 1.1 | C. Example 1.2 | C. Example 1.3 |
|---|---|---|---|---|---|---|
| Dilution | 1:1 | 1:1 | 1:1 | 1:1000 | 1:1000 | 1:1000 |
| CFU/ml | 0.00E+00 | 0.00E+00 | 0.00E+00 | 2.70E+06 | 2.80E+06 | 3.07E+06 |

C = control.

TABLE 2

S. aureus-Control and modified coupons were immersed in Staph aureus culture (24 wells, 0.5 ml, OD600 = 0.01) for 1 hour

|  | Example 2.1 | Example 2.2 | Example 2.3 | C. Example 2.1 | C. Example 2.2 | C. Example 2.3 |
|---|---|---|---|---|---|---|
| Dilution | 1:1 | 1:1 | 1:1 | 1:1000 | 1:1000 | 1:1000 |
| CFU/ml | 0.00E+00 | 0.00E+00 | 0.00E+00 | 3.37E+06 | 3.20E+06 | 2.90E+06 |

TABLE 3

S. epidermidis-Control and modified coupons were immersed in Staph epidermidis culture (24 wells, 0.5 ml, OD600 = 0.01) for 1 hour

|  | Example 3.1 | Example 3.2 | Example 3.3 | C. Example 3.1 | C. Example 3.2 | C. Example 3.3 |
|---|---|---|---|---|---|---|
| Dilution | 1:1 | 1:1 | 1:1 | 1:1000 | 1:1000 | 1:1000 |
| CFU/ml | 0.00E+00 | 0.00E+00 | 0.00E+00 | 2.53E+06 | 2.23E+06 | 2.40E+06 |

TABLE 4

P. aeruginosa-Control and modified coupons were immersed in P. aeriginosa (24 wells, 0.5 ml, OD600 = 0.01) for 1 hour

|  | Example 4.1 | Example 4.2 | Example 4.3 | C. Example 4.1 | C. Example 4.2 | C. Example 4.3 |
|---|---|---|---|---|---|---|
| Dilution | 1:1 | 1:1 | 1:1 | 1:1000 | 1:1000 | 1:1000 |
| CFU/ml | 1.87E+04 | 1.67E+04 | 1.93E+04 | 1.13E+06 | 1.03E+06 | 1.20E+06 |

Figure 2:
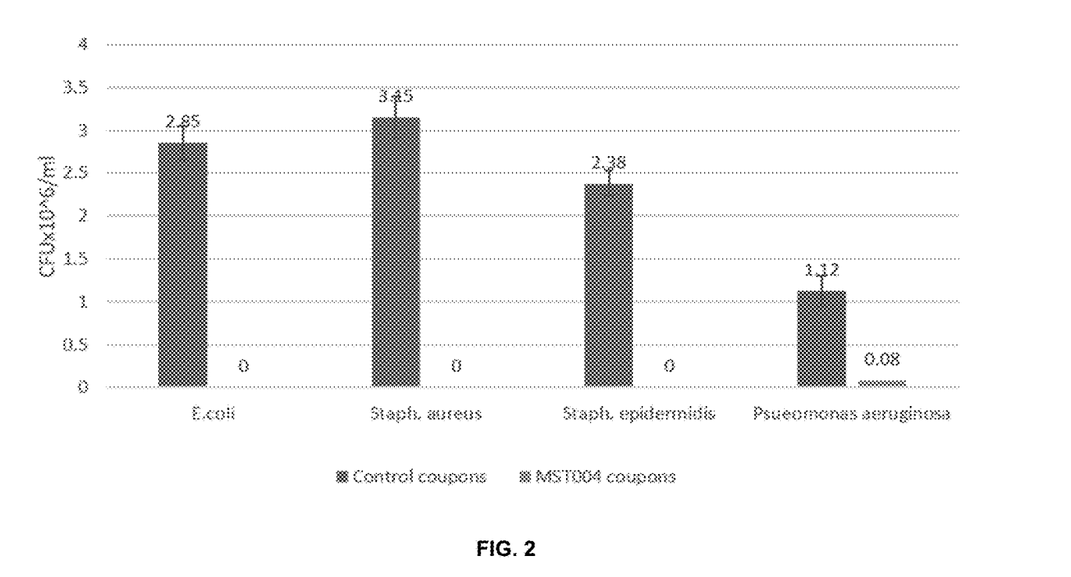
FIG. 2 shows the average CFU/ml values for chitosan-coated coupons and control coupons after immersion in various bacterial strains.

The results in Tables 1 to 4 are summarized in Table 5 below, and in FIG. 2. As can be seen from these results, the modified surfaces have a significantly higher antibacterial effect compared to unmodified surfaces.

TABLE 5

|  | Avg. CFU/ml (Control coupons) | SD for control coupons | Avg. CFU/ml (MST coupons) | SD for MST coupons | Approx. bacteria killing power |
|---|---|---|---|---|---|
| E. coli | 2.85 | 0.19 | 0 | 0 | >100,000 |
| S. aureus | 3.15 | 0.24 | 0 | 0 | >100,000 |
| S. epidermis | 2.38 | 0.15 | 0 | 0 | >100,000 |
| P. aeruginosa | 1.12 | 0.18 | 0.08 | 0.014 | 14 |

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only and are not intended to limit the technical concept of the present disclosure. The protective scope of the present disclosure should be construed based on any appended claims and combinations thereof, and all the technical concepts in the equivalent scope thereof should be construed as falling within the scope of the present disclosure. As various changes could be made in the above methods and compositions without departing from the scope of the invention, it is intended that all matter contained in the above description shall be interpreted as illustrative and not in a limiting sense. Other embodiments within the scope of the claims herein will be apparent to one skilled in the art from consideration of the specification or practice of the invention as disclosed herein. It is intended that the specification be considered exemplary only, with the scope and spirit of the invention being indicated by the claims.

REFERENCES

1. DUBEY et al., Structure and Order of Phosphonic Acid-Based Self-Assembled Monolayers on Si(100), Langmuir, 2010, 26 (18), pp 14747-14754.
2. DUBEY et al., Characterization of self-assembled organic films using differential charging in X-ray photoelectron spectroscopy, Langmuir, 2006, 22 (10), pp 4649-4653.
3. GAO et al., Solid-State Nmr-Studies of Self-Assembled Monolayers, Langmuir, 1995, 11 (6), pp 1860-1863.
4. GAWALT et al., Enhanced bonding of alkanephosphonic acids to oxidized titanium using surface-bound alkoxyzirconium complex interfaces, Langmuir, 1999, 15 (26), pp 8929-8933.
5. GAWALT et al., Self-assembly and bonding of alkanephosphonic acids on the native oxide surface of titanium, Langmuir, 2001; 17 (19), pp 5736-5738.
6. GAWALT et al., Enhanced bonding of organometallics to titanium via a titanium(III) phosphate interface, Langmuir, 2001; 17 (21), pp 6743-6745.
7. GOUZMAN et al., Monolayer vs. multilayer selfassembled alkylphosphonate films: X-ray photoelectron spectroscopy studies, Surface Science. 2006; 600 (4), pp 773-781.
8. HANSON et al., Bonding self-assembled, compact organophosphonate monolayers to the native oxide surface of silicon, J. Am. Chem. Soc., 2003, 125 (51), pp 16074-16080.
9. WOODWARD et al., Self-assembled monolayer growth of octadecylphosphonic acid on mica, Langmuir, 1996, 12 (15), pp 3626-3629.
10. JENNINGS et al., Chitosan Based Biomaterials, Vol. 2: Tissue Engineering and Therapeutics, 2017, Elsevier
11. ANITHA et al., Synthesis, characterization, cytotoxicity and antibacterial studies of chitosan, O-carboxymethyl and N, O-carboxymethyl chitosan nanoparticles, Carbohydrate Polymers, 2009.
12. PRABAHARAN et al., Review paper: chitosan derivatives as promising materials for controlled drug delivery, Journal of Biomaterials Applications, 2008, 23, pp 5-36.
13. Jayakumar et al., Novel chitin and chitosan nanofibers in biomedical applications, Biotechnology Advances, 2010, 28, 142-150.
14. Jayakumar et al., Bioactive and metal uptake studies of carboxymethyl chitosan-graft-D-glucuronic acid membranes for tissue engineering and environmental applications, International Journal of Biological Macromolecules, 2009, 45, 135-139.
15. JENNINGS et al., Chitosan Based Biomaterials, Vol. 1: Fundamentals, 2017, Elsevier.
16. Madhumathi et al., Development of novel chitin/nanosilver composite scaffolds for wound dressing applications, Journal of Materials Science: Materials in Medicine, 2010, 21, 807-813.
17. Borchard, G., Chitosans for gene delivery, Advanced Drug Delivery Reviews, 2001, 52, 145-150.
18. Jayakumar et al., Chitosan conjugated DNA nanoparticles in gene therapy, Carbohydrate Polymers, 2010, 79, 1-8.
19. Tiwari et al., Electrochemical synthesis of chitosan-co-polyaniline/WO3-nH$_2$O composite electrode for amperometric detection of NO$_2$ gas, Electroanalysis, 2008, 20, 1775-1781.
20. Hirano et al., Effects of chitosan, pectic acid, lysozyme, and chitinase on the growth of several phytopathogens, Agricultural and Biological Chemistry, 1989, 53 (11), 3065-3066.

The invention claimed is:
1. An article, comprising:
a work piece having a modified-metal surface,
wherein the modified-metal surface comprises a chitosan modified with a quaternary ammonium salt, and
wherein the chitosan is connected to a surface of the work piece via a phosphorous-based acid linker.
2. The article according to claim 1, wherein the phosphorous-based acid is a phosphonic acid, a phosphoric acid, a phosphinic acid, or mixtures thereof.
3. The article according to claim 2, wherein the phosphonic acid is 11-phosphono-1-undecanol.
4. The article according to claim 1, wherein the article has an antibacterial effect.
5. The article according to claim 1, wherein the metal is selected from a Ti or a Ti alloy.
6. The article according to claim 1, wherein the chitosan is connected to the phosphorous-based acid linker via a carbonyldiimidazolyl moiety.

* * * * *